(12) United States Patent
Friedman

(10) Patent No.: US 8,548,908 B2
(45) Date of Patent: Oct. 1, 2013

(54) MOBILE COMMERCE INFRASTRUCTURE SYSTEMS AND METHODS

(75) Inventor: Brian Friedman, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 369 days.

(21) Appl. No.: 12/100,082

(22) Filed: Apr. 9, 2008

(65) Prior Publication Data

US 2008/0255947 A1 Oct. 16, 2008

Related U.S. Application Data

(60) Provisional application No. 60/911,113, filed on Apr. 11, 2007.

(51) Int. Cl.
*G06Q 40/00* (2012.01)

(52) U.S. Cl.
USPC .................................................. 705/41

(58) Field of Classification Search
USPC ..................................... 705/35–45
See application file for complete search history.

(56) References Cited

U.S. PATENT DOCUMENTS

| | | |
|---|---|---|
| 5,671,279 A | 9/1997 | Elgamal |
| 5,892,900 A | 4/1999 | Ginter et al. |
| 5,903,721 A | 5/1999 | Sixtus |
| 6,311,171 B1 | 10/2001 | Dent |
| 6,327,578 B1 | 12/2001 | Linehan |
| 6,370,514 B1 * | 4/2002 | Messner ..................... 705/14.26 |
| 6,836,765 B1 | 12/2004 | Sussman |
| 6,873,974 B1 | 3/2005 | Schutzer |
| 6,931,382 B2 | 8/2005 | Laage et al. |
| 6,935,561 B2 | 8/2005 | Chernomorov |
| 7,062,258 B1 | 6/2006 | Sini et al. |
| 7,088,995 B2 * | 8/2006 | Rao ................................. 455/418 |
| 7,089,208 B1 | 8/2006 | Levchin et al. |
| 7,133,659 B2 * | 11/2006 | Zalewski et al. .............. 455/403 |
| 7,162,454 B1 | 1/2007 | Donner et al. |
| 7,711,620 B2 * | 5/2010 | Abifaker ........................ 705/35 |
| 7,850,079 B2 * | 12/2010 | Lovegreen et al. ........... 235/383 |
| 8,016,192 B2 * | 9/2011 | Messerges et al. ........... 235/380 |

(Continued)

FOREIGN PATENT DOCUMENTS

| | | |
|---|---|---|
| EP | 1467300 A1 | 10/2004 |
| WO | WO 2005/079254 A2 | 9/2005 |

OTHER PUBLICATIONS

"Cyphermint adds card linking to PayCash mobile payment system", Electronic Payments International (Jan. 2007), pp. 1-2.*

(Continued)

*Primary Examiner* — Mohammad Z Shaikh
(74) *Attorney, Agent, or Firm* — Kilpatrick Townsend & Stockton LLP

(57) ABSTRACT

Methods, systems, and machine readable media are disclosed for utilizing mobile electronic devices in various types of financial transactions. According to one embodiment, a system for supporting mobile commerce applications can include a management and control layer. The management and control layer can be adapted to control communications to and from mobile wallet applications. The system can also have a gateway services layer communicatively coupled with the management and control layer and a plurality of content provider systems communicatively coupled with the gateway services layer. The content provider systems can be adapted to provide financial transaction content or services related to the mobile commerce functions of the mobile wallet applications via the management and control layer and gateway services layer.

28 Claims, 7 Drawing Sheets

(56) References Cited

U.S. PATENT DOCUMENTS

| | | | |
|---|---|---|---|
| 8,099,361 B1* | 1/2012 | Gupta et al. | 705/40 |
| 8,249,047 B2* | 8/2012 | Chun et al. | 370/343 |
| 2002/0010612 A1* | 1/2002 | Smith et al. | 705/8 |
| 2002/0013765 A1 | 1/2002 | Shwartz | |
| 2002/0032616 A1 | 3/2002 | Suzuki et al. | |
| 2002/0052841 A1 | 5/2002 | Guthrie et al. | |
| 2002/0052842 A1 | 5/2002 | Schuba et al. | |
| 2002/0065774 A1 | 5/2002 | Young et al. | |
| 2002/0107755 A1 | 8/2002 | Steed et al. | |
| 2002/0107791 A1 | 8/2002 | Nobrega et al. | |
| 2002/0152179 A1 | 10/2002 | Racov | |
| 2002/0178060 A1 | 11/2002 | Sheehan | |
| 2003/0028484 A1 | 2/2003 | Boylan et al. | |
| 2003/0110138 A1 | 6/2003 | Van Do et al. | |
| 2003/0200184 A1 | 10/2003 | Dominguez et al. | |
| 2004/0010462 A1 | 1/2004 | Moon et al. | |
| 2004/0019564 A1 | 1/2004 | Goldthwaite et al. | |
| 2004/0029569 A1 | 2/2004 | Khan et al. | |
| 2004/0176995 A1 | 9/2004 | Fusz | |
| 2004/0181448 A1 | 9/2004 | Hartsman et al. | |
| 2004/0210498 A1* | 10/2004 | Freund | 705/30 |
| 2004/0230489 A1* | 11/2004 | Goldthwaite et al. | 705/26 |
| 2004/0230536 A1 | 11/2004 | Fung et al. | |
| 2004/0249753 A1* | 12/2004 | Blinn et al. | 705/41 |
| 2005/0131808 A1 | 6/2005 | Villa | |
| 2005/0177442 A1 | 8/2005 | Sullivan et al. | |
| 2005/0187873 A1 | 8/2005 | Labrou et al. | |
| 2005/0222906 A1 | 10/2005 | Chen | |
| 2005/0222961 A1 | 10/2005 | Staib et al. | |
| 2005/0240477 A1 | 10/2005 | Friday et al. | |
| 2005/0240522 A1 | 10/2005 | Kranzley et al. | |
| 2005/0256802 A1* | 11/2005 | Ammermann et al. | 705/44 |
| 2006/0006226 A1* | 1/2006 | Fitzgerald et al. | 235/380 |
| 2006/0085357 A1 | 4/2006 | Pizarro | |
| 2006/0106699 A1 | 5/2006 | Hitalenko et al. | |
| 2006/0165060 A1 | 7/2006 | Dua | |
| 2006/0190332 A1* | 8/2006 | Grider | 705/14 |
| 2006/0212355 A1 | 9/2006 | Teague et al. | |
| 2006/0294025 A1 | 12/2006 | Mengerink | |
| 2007/0055597 A1* | 3/2007 | Patel et al. | 705/35 |
| 2007/0094113 A1 | 4/2007 | Chapeta | |
| 2007/0095892 A1* | 5/2007 | Lyons et al. | 235/379 |
| 2007/0206507 A1* | 9/2007 | Reichman et al. | 370/252 |
| 2007/0270125 A1* | 11/2007 | Pousti | 455/406 |
| 2007/0278290 A1* | 12/2007 | Messerges et al. | 235/380 |
| 2008/0010215 A1 | 1/2008 | Rackley, III et al. | |
| 2008/0052164 A1* | 2/2008 | Abifaker | 705/14 |
| 2008/0099552 A1 | 5/2008 | Grillion | |
| 2008/0154772 A1* | 6/2008 | Carlson | 705/44 |
| 2008/0160974 A1 | 7/2008 | Vartiainen et al. | |
| 2008/0167017 A1* | 7/2008 | Wentker et al. | 455/414.1 |
| 2008/0172306 A1* | 7/2008 | Schorr et al. | 705/26 |
| 2008/0185433 A1 | 8/2008 | Ando et al. | |
| 2008/0208742 A1* | 8/2008 | Arthur et al. | 705/41 |
| 2008/0255942 A1* | 10/2008 | Craft | 705/14 |
| 2008/0255947 A1* | 10/2008 | Friedman | 705/14 |

OTHER PUBLICATIONS

Encryptix, Inc. Unveils Ultra-Secure Service for Purchase, Delivery and Redemption of Value Over Wireless Networks Company Showcases Industry-First, Wireless Delivery Service At DEMOmobile 2000, Pasadena, CA.—Sep. 6, 2000.*

Longino, Carlo, "More on Mobile Fulfillment", Marketing, Aug. 16, 2006, p. 1.*

Shillingford, Joia, "Online Mobile matters: Pay your way by phone: Forgot your wallet? No problem. Use your mobile to pay your out of trouble, says Joia Shillingfor", The Guardian. Manchester (UK): Jan. 17, 2002, pp. 1-3.*

Authorization.net found on Jan. 16, 2009 online at http://web.archive.org/web/20050316102434/http://www.authorize.net/resources/faqs, 9 pages.

Kwok et al., "Digital Rights Management for Mobile Commerce Using Web Services," Journal of Electronic Commerce Research, vol. 7, No. 1, 2006, entire document.

Internet Archive Wayback Machine, http://web.archive.org/web/*/http://www.3xswco.uk, downloaded Mar. 22, 2010, 1 page.

* cited by examiner

MOBILE COMMERCE INFRASTRUCTURE SYSTEMS AND METHODS

CROSS-REFERENCES TO RELATED APPLICATIONS

This application claims the benefit of U.S. Provisional Application No. 60/911,113, filed Apr. 11, 2007, entitled MOBILE COMMERCE INFRASTRUCTURE SYSTEMS AND METHODS the complete disclosure of which is incorporated herein by reference for all purposes.

BACKGROUND OF THE INVENTION

Embodiments of the present invention generally relate to payment systems. More specifically, embodiments of the present invention relate to payment systems supporting use of mobile electronic devices in various types of financial transactions.

Today, merchants and service providers accept many forms of payment. Many merchants will accept cash, credit cards, debit cards, stored-value cards, checks, and promotional items such as coupons. All of these forms of payment are often carried by a consumer because some merchants and/or service providers may only accept some of the various possible forms of payment. Sometimes a customer may not pre-plan a visit to a specific merchant and/or service provider, so the consumer may wish to carry the different forms of payment in case the consumer does happen to make an unplanned visit.

This can lead to numerous methods of payments being carried by a consumer on a day-to-day basis. Additionally, a consumer may also need to carry other items regularly such as drivers license, identification cards, loyalty program cards, and membership cards. When a consumer has to carry all of these items, they may also become disorganized and misplaced, causing security concerns, and possibly causing transactions to consume more time.

Additionally, various forms of wireless or contactless devices have been introduced for use in various types of transactions. For example, contactless transaction initiation is often performed with a "smart" card or other device such as a key fob or a mobile device such as a cell phone or Personal Digital Assistant (PDA) containing a memory and a processor. Such a card or device typically also includes Radio-Frequency IDentification ("RFID") or Near-Field Communications (NFC) components for contactless communication with a Point-Of-Sale (POS) device. The information stored in the memory of the device and communicated via the RFID or NFC components to the POS device is generally similar or identical to the information recorded on the magnetic stripe of a card, i.e., account number etc. Thus, in some cases, such devices may be utilized instead of more conventional cards.

However, current payment systems that use contactless devices are restricted to particular payment channels. For example, in some systems, payment requests initiated by the use of a contactless device are routed through a conventional debit or credit authorization network. In other systems, payment requests are processed offline by the device, which includes a "stored value" account balance. In other cases, transactions involving such stored value or pre-paid accounts are processed online by systems maintaining account balance and other information. The networks and systems handling credit, debit, pre-paid, and possibly other accounts are separate from each other. Furthermore, these networks and systems may not be compatible or interoperable. Therefore, a device intended for use on one network or system may not be usable on a POS device operating on another network. Additionally, the ability of any given device to handle more than one account or account type is limited. Therefore, the use such contactless devices has not successfully reduced the number of different forms of payment a consumer carries. Hence, there is a need in the art for improved methods and systems for utilizing mobile electronic devices in various types of financial transactions.

BRIEF SUMMARY OF THE INVENTION

Methods, systems, and machine-readable media are disclosed for utilizing mobile electronic devices in various types of financial transactions. According to one embodiment, a system for supporting mobile commerce applications can comprise a plurality of wireless communications networks and a plurality of mobile devices communicatively coupled with each of the plurality of wireless communications networks. For example, the plurality of wireless communications networks can comprise a plurality of cellular networks. According to one embodiment, the plurality of wireless communications networks comprises at least a first network operated by a first carrier and a second network operated by a second carrier. Each of the mobile devices can be adapted to execute a mobile wallet application providing access to a plurality of mobile commerce functions.

The system can include a management and control layer communicatively coupled with the plurality of communications networks. The management and control layer can be adapted to control communications to and from the mobile wallet applications. The system can also have a gateway services layer communicatively coupled with the management and control layer and a plurality of content provider systems communicatively coupled with the gateway services layer. The content provider systems can be adapted to provide financial transaction content or services related to the mobile commerce functions of the mobile wallet applications. For example, the plurality of content provider systems comprises one or more host systems of one or more financial institutions. In another example, the plurality of content provider systems comprises one or more payment networks. In yet another example, the plurality of content provider systems comprise one or more host systems providing marketing content.

The management and control layer can be adapted to control communications to and from the mobile wallet applications related to banking functions of the mobile wallet applications. Additionally or alternatively, the management and control layer can be adapted to control communications to and from the mobile wallet applications related to payment functions of the mobile wallet applications. Additionally or alternatively, the management and control layer can be adapted to control communications to and from the mobile wallet applications related to marketing functions of the mobile wallet applications.

According to one embodiment, the gateway services layer can be further adapted to route communications between the management and control layer and one or more of the plurality of content provider systems. Additionally or alternatively, the gateway services layer can be further adapted to provide Over-The-Air (OTA) services between the management and control layer and the plurality of content provider systems. In some cases, the gateway services layer can be further adapted to provide hosted banking services for one or more of the content provider systems. Additionally or alternatively, the gateway services layer can be adapted to provide offer management services for managing information related to marketing functions of the mobile wallet applications. In some cases, the gateway services layer can be adapted to provide content management services for managing information related to content discovery functions of the mobile wallet applications.

DETAILED DESCRIPTION OF THE INVENTION

Figure 1:
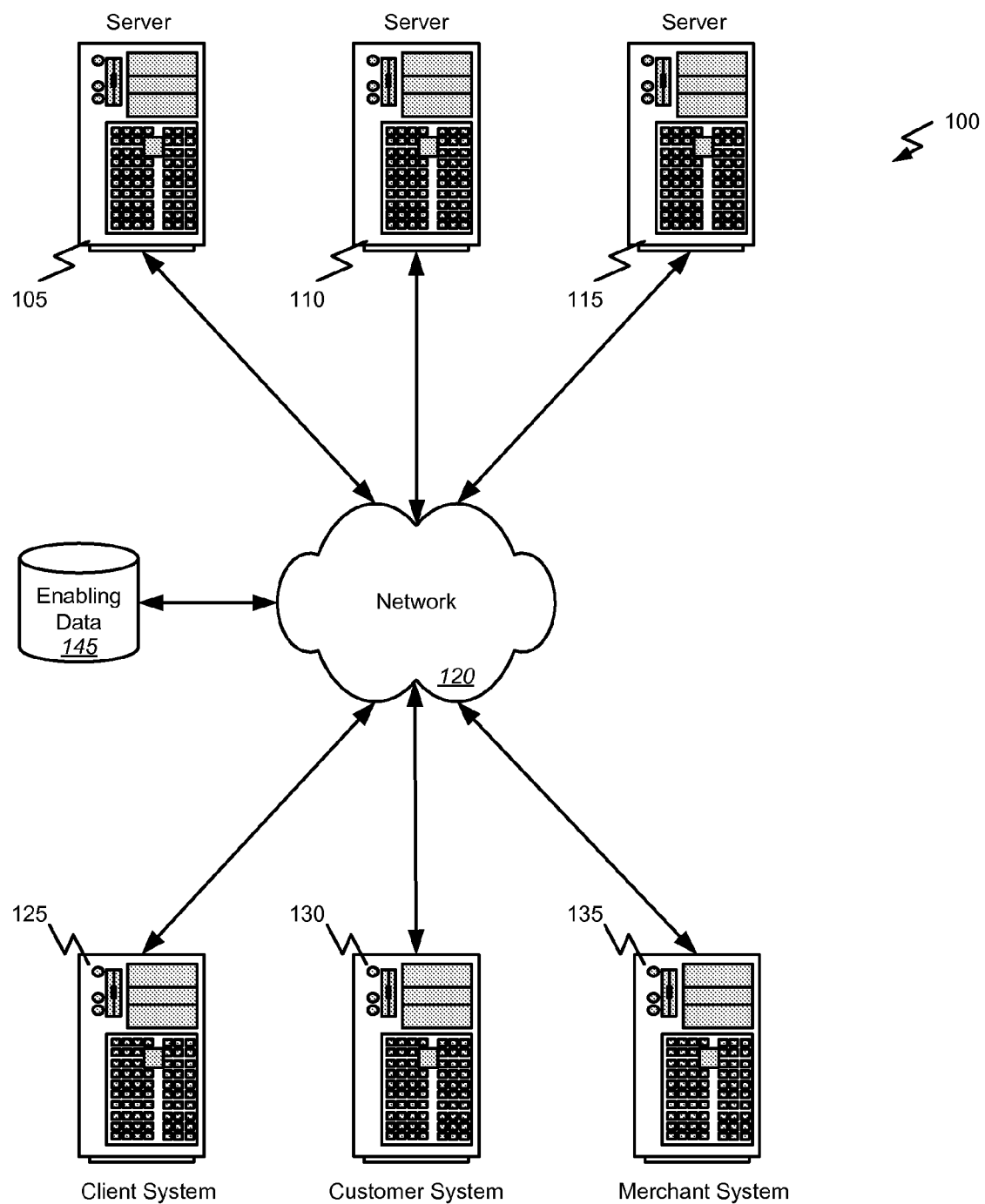
FIG. 1 is a block diagram illustrating an exemplary environment in which embodiments of the present invention may be implemented.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the invention provide methods and systems for processing various financial transactions initiated by or otherwise involving use of a contactless or mobile device as well as other information related to one or more financial accounts. In some such embodiments, the processes are executed by an entity on behalf of one or more client organizations. The description below sometimes provides illustrations that use an example where a client organization is a financial institution, but there is no such requirement for the invention and the methods are intended also to be applicable to other types of organizations that make use of large collections of data. For example, embodiments of the invention may also be used for managing health-care documents or information.

The description herein sometimes refers to "clients" and to "customers." Reference to "clients" is intended to refer to persons, i.e. individuals, entities, or their agents, on whose behalf a set of information is managed. Reference to "customers" or "consumer" is intended to refer to persons, i.e. individuals, entities, or their agents, who are the subject of or related to that information. Thus, merely for purposes of illustration, in the case where the information comprises credit-card account records for a credit card issued to Mr. Jones by Bank A, Bank A corresponds to a client and Mr. Jones corresponds to a customer or consumer.

In describing embodiments of the invention, reference is sometimes made to other terms having specific intended meanings. For example, as used herein, the term "carrier" refers to a provider of a network and/or service for use by a mobile device. For example, a carrier can include, but is not limited to, a provider of a cellular or other wireless communications service for use by a mobile device.

An "electronic receipt" refers to a receipt for payment of goods or services that can be created for and relate to one or more transactions. An electronic receipt can include information related to the transaction(s) and may be electronically transferred to the user's mobile device. According to one embodiment, electronic receipts can be stored in a mobile wallet of the mobile device.

The term "mobile device" is used herein to refer to any small, likely handheld, electronic device that can be used to initiate or otherwise participate in a financial transaction. For example, a mobile device can include, but is not limited to a cellular telephone, a Personal Digital Assistant (PDA), a smart card or other contactless device, etc. Exemplary devices that may be adapted for use as mobile devices in various embodiments of the present invention are described in co-pending and commonly assigned U.S. patent application Ser. No. 11/672,417 entitled "Contactless Electronic Wallet Payment Device" filed on Feb. 7, 2007; U.S. patent application Ser. No. 11/551,063 entitled "Presentation Instrument with Non-Financial Functionality" filed on Oct. 19, 2006; and U.S. Provisional Patent Application No. 60/833,022 entitled "Mobile Payment Device with Magnetic Stripe" filed on Jul. 24, 2006, each of which is incorporated herein by reference in its entirety for all purposes.

A "mobile wallet" refers to a software application that can reside on and/or be executed by a mobile device. According to one embodiment, the mobile wallet can be adapted to store payment vehicle information. In some cases, the mobile wallet can allow storage of multiple payment vehicles and can provide a user interface that can be used to select a specific payment vehicle. Additionally, the mobile wallet can be adapted to provide security to deter fraudulent and unauthorized use of the payment vehicles. As used herein, the terms mobile device, handset, and contactless device are intended to be synonymous. A "Mobile Wallet" can also be referred to as a handset "container".

"Near Field Communication" (NFC) refers to short range (20 cm or less) wireless technology used to facilitate communication between electronic devices in close proximity as defined, for example, by the ISO 14443 standard. For example, embodiments of the present invention provide for the use of NFC and/or other relatively short range communications between a mobile device and a POS device such as when a user of the mobile device scans or waves or taps the mobile device in front of or near the POS device when paying for goods or services.

"Payment applications" include, but are not limited to; Debit, Credit, Open and Closed loop Stored Value, and Private Label or similar proprietary payment applications. Further, payment applications can be associated with exiting or new network infrastructures that might support open acceptance or closed/proprietary payment models.

A "payment network" refers herein to an infrastructure that supports that exchange of data in implementing payment transactions. It is anticipated that the data exchange typically proceeds between merchants and financial institutions. Examples of existing commercial networks that are included within the definition of "payment network" include the STAR/MAC network, the NYCE® network, the VISA® network, and the MasterCard® network. Access to a network by a consumer can be achieved through entry of a secret code, such as a personal identification number ("PIN"), in combination with data extracted from the mobile device. In some embodiments, a signature of the consumer may be used in lieu of a secret code. In some instances, particularly in support of transactions having a low value, a consumer might be permitted access to the payment network with only information extracted from the mobile device, without the need to provide a PIN or signature. Rules governing the use or non-use of PINs, signatures, or such processes are established by the "payment network" and can change from time-to-time. Payment networks can be either existing association branded networks, or newly established networks that might be constructed in 'open' or 'closed/proprietary' architectures.

The term "payment vehicle" is used herein to refer to a method of payment. For example, payment vehicles can include, but are not limited to credit, debit, stored-value, and other types of accounts. In some embodiments, a payment vehicle can include loyalty points or other value accumulated, for example, under a loyalty program.

A "point-of-sale device" or "POS device" refers herein to any physical device situated at a location where a consumer may provide payment in support of a transaction. Such physical locations are typically merchant locations, such as where the POS device is operated by a clerk or is available for self-operation by the consumers (such as a vending machine), but may also be in other locations. For instance, certain automatic teller machines "ATMs" may be equipped to support transactions for the sale of movie or sporting-event tickets even remote from the merchant location; other similar types of transactions that may be performed with a POS device at a location remote from the merchant will also be evident to those of skill in the art. In some cases, a personal computer equipped with the appropriate structure may be used as a POS device even when located on the consumer premises. Examples of POS devices thus include, without limitation, personal computers, cash registers, and any devices capable of reading a magnetic stripe, an RFID chip, NFC communications, or other information from a mobile device, contactless device, card, etc. Exemplary devices that may be adapted for use in various embodiments of the present invention are described in the following commonly assigned applications, the entire disclosures of which are incorporated herein by reference for all purposes: U.S. Provisional Patent Application No. 60/147,889, entitled "Integrated Point OF Sale Device," filed Aug. 9, 1999 by Randy J. Templeton et al; U.S. patent application Ser. No. 09/634,901, entitled "Point of Sale Payment System," filed Aug. 9, 2000 by Randy J. Templeton et al.; U.S. patent application Ser. No. 10/116,689, entitled "Systems and Methods for Performing Transactions at a Point-of-Sale," filed Apr. 3, 2002 by Earney Stoutenburg et al.; U.S. patent application Ser. No. 10/116,733, entitled "Systems and Methods for Deploying a Point-of-Sale System," filed Apr. 3, 2002 by Earney Stoutenburg et al.; U.S. patent application Ser. No. 10/116,686, entitled "Systems and Methods for Utilizing A Point-of-Sale System," filed Apr. 3, 2002 by Earney Stoutenburg et al.; and U.S. patent application Ser. No. 10/116,735, entitled "Systems and Methods for Configuring a Point-of-Sale System," filed Apr. 3, 2002 by Earney Stoutenburg.

A "POS processing system" refers to a computational system used by merchants to control communications between POS devices and payment networks. Such systems may be run internally by merchants, may be run by merchant consortia, or may be outsourced to service providers in different embodiments. Some exemplary POS processing systems which may be adapted to operate with embodiments of the present invention are described in commonly assigned U.S. Pat. Nos. 6,886,742, 6,827,260 and 7,086,584, the complete disclosures of which are herein incorporated by reference.

A "primary account number" or "PAN" refers to a number assigned to an account. The PAN is generally assigned by a financial institution maintaining the account. In most embodiments, it is anticipated that the PAN will identify an account associated with the wireless device. Identification of the PAN permits a financial institution that maintains the account to make a unique identification of the consumer initiating a payment or other transaction and determine which of potentially several accounts is to be used in supporting the transaction. In other cases, a PAN proxy may be used where the proxy is a unique value that is associated with a PAN outside of the POS interaction. As an example a proxy might be a subscribers mobile phone number. This number could be used to facilitate a transaction at the point-of-sale, and then replaced (or cross-referenced) with an actual PAN during the host based transaction posting and settlement process.

The terms "real time" or "near real time" are used herein to refer to a process or action that occurs within a relatively short time. Importantly, the terms real time and near real time are not intended to imply an immediate or instantaneous results or action. Rather, the terms are used to refer to process or actions that can be performed relatively quickly such as within several seconds or minutes.

A "service provider" is an organization that creates, supplies, supports, and/or owns the mobile application, e.g., the mobile wallet. According to one embodiment, an acquirer can also be a service provider, for example, with regard to supporting mobile accounts, stored value products or accounts, etc.

The term "subscriber" is used herein to refer to a consumer who has contracted with a carrier to utilized the carrier's wireless communications network. It should be noted that the term subscriber is used in reference to a consumer contracting with a carrier while the terms customer/consumer, as described above, is used in reference to a consumer contracting with a financial services or merchant organization. It should be understood that the "subscriber" and "consumer/customer" can be the same individual or "user.".

The term "user" refers to an entity, typically a person, that is associated with a particular mobile device. Typically, the user is the person that owns, uses, or leases the mobile device and/or controls the content and use of the payment vehicles maintained within the mobile wallet of the device.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention provide methods, systems, and machine-readable media for supporting use of mobile devices in various types of financial transactions. Generally speaking, a mobile device such as a cell phone, PDA, MP3 player, or other device can be adapted to execute a mobile wallet application and possibly other applications that provide any of a number of mobile commerce functions. For example, the mobile wallet and other elements described herein can allow the user of the mobile device to use the device to make purchases, receive and maintain receipts or other records of transactions, look up account balances, transfer balances, etc. Furthermore, embodiments described herein provide for the use mobile devices operating different mobile wallet applications on devices operating on different carrier networks. That is, embodiments of the present invention can be wallet application and/or carrier network agnostic. Additionally, embodiments of the present invention can be used to interact with a wide variety of content provider systems such as financial institutions, payment networks, advertisers, and other content providers. Thus, embodiments of the present invention can also be content provider agnostic.

FIG. 1 is a block diagram illustrating an exemplary environment in which embodiments of the present invention may be implemented. In this example, the system can include one or more server computers 105, 110, 115 which can be general purpose computers and/or specialized server computers (including, merely by way of example, PC servers, UNIX servers, mid-range servers, mainframe computers rack-mounted servers, etc.). One or more of the servers (e.g. 130) may be dedicated to running applications, such as a business application, a web server, application server, etc. Such servers may be used to execute a plurality of processes related to financial transactions of one or more consumers on behalf of one or more client financial institutions. For example, one or more of the servers 105, 110, 115 may execute one or more processes for recording transactions on a credit card issued to the consumer by the financial institution. Other processes may provide for paying a merchant for the consumer's purchase, billing the consumer, etc The applications can also include any number of applications for controlling access to resources of the servers 105, 110, 115.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system 100 can include one or more user computers which may be used to operate a client, whether a dedicate application, web browser, etc. For example, the user computers can include a client system 125 operated by a client financial institution, a customer system 130 operated by a customer or consumer, a merchant system 135 operated by a merchant or vendor, etc. The user computers 125, 130, 135 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 125, 130, 135 may also have any of a variety of applications, including one or more development systems, database client and/or server applications, and web browser applications. Alternatively, the user computers 125, 130, 135 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with three user computers, any number of user computers may be supported.

The system 100 may also include one or more databases or repositories of enabling data 145. The database(s) of enabling data 145 may reside in a variety of locations. By way of example, a database 145 may reside on a storage medium local to (and/or resident in) one or more of the computers 105, 110, 115, 125, 130. Alternatively, it may be remote from any or all of the computers 105, 110, 115, 125, 130, and/or in communication (e.g. via the network 120), or directly accessed outside of the network, with one or more of these. In a particular set of embodiments, the database 145 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 145 may be a relational database that is adapted to store, update, and retrieve data in response to SQL-formatted, or similarly formatted, commands. The repository of enabling data 145 can include a wide variety of information related to financial transactions related to the consumer and/or specified by different entities such as merchants, financial institutions, third-party advertisers, etc.

Figure 2:
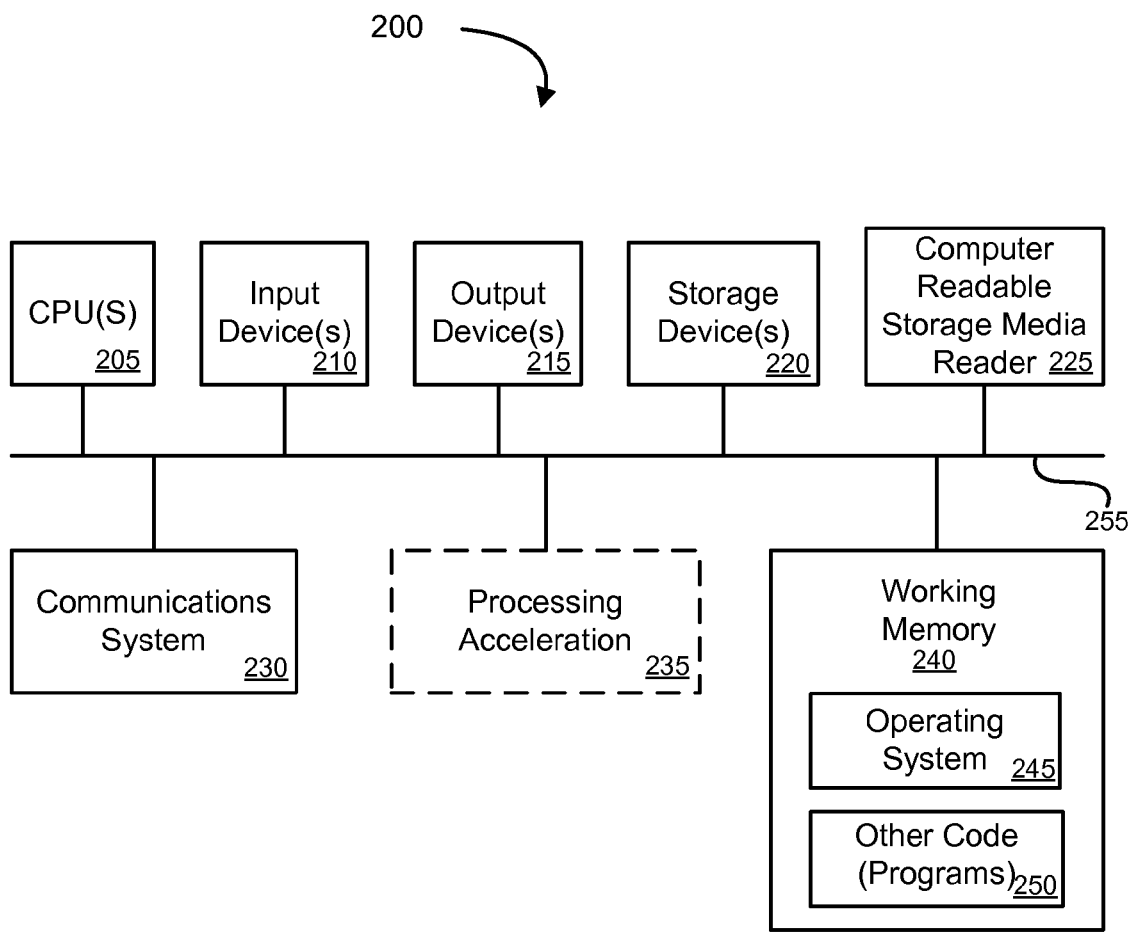
FIG. 2 is a block diagram illustrating an exemplary computer system upon which embodiments of the present invention may be implemented.

FIG. 2 is a block diagram illustrating an exemplary computer system upon which various elements of the exemplary environment illustrated in FIG. 1 may be implemented. The computer system 200 is shown comprising hardware elements that may be electrically coupled via a bus 255. The hardware elements may include one or more central processing units (CPUs) 205; one or more input devices 210 (e.g. a scan device, a mouse, a keyboard, etc.); and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225; a communications system 230 (e.g., a modem, a network card (wireless or wired), an infra-red communication device, etc.); and working memory 240, which may include RAM and ROM devices as described above communicatively coupled with and readable by CPU(s) 205. In some embodiments, the computer system 200 may also include a processing acceleration unit 235, which can include a DSP, a special-purpose processor and/or the like.

The computer-readable storage media reader 225 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with a network and/or any other computer or other type of device.

The computer system 200 may also comprise software elements, shown as being currently located within a working memory 240, including an operating system 245 and/or other code 250, such as an application program. The application programs may implement the methods of the invention as described herein. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Figure 3:
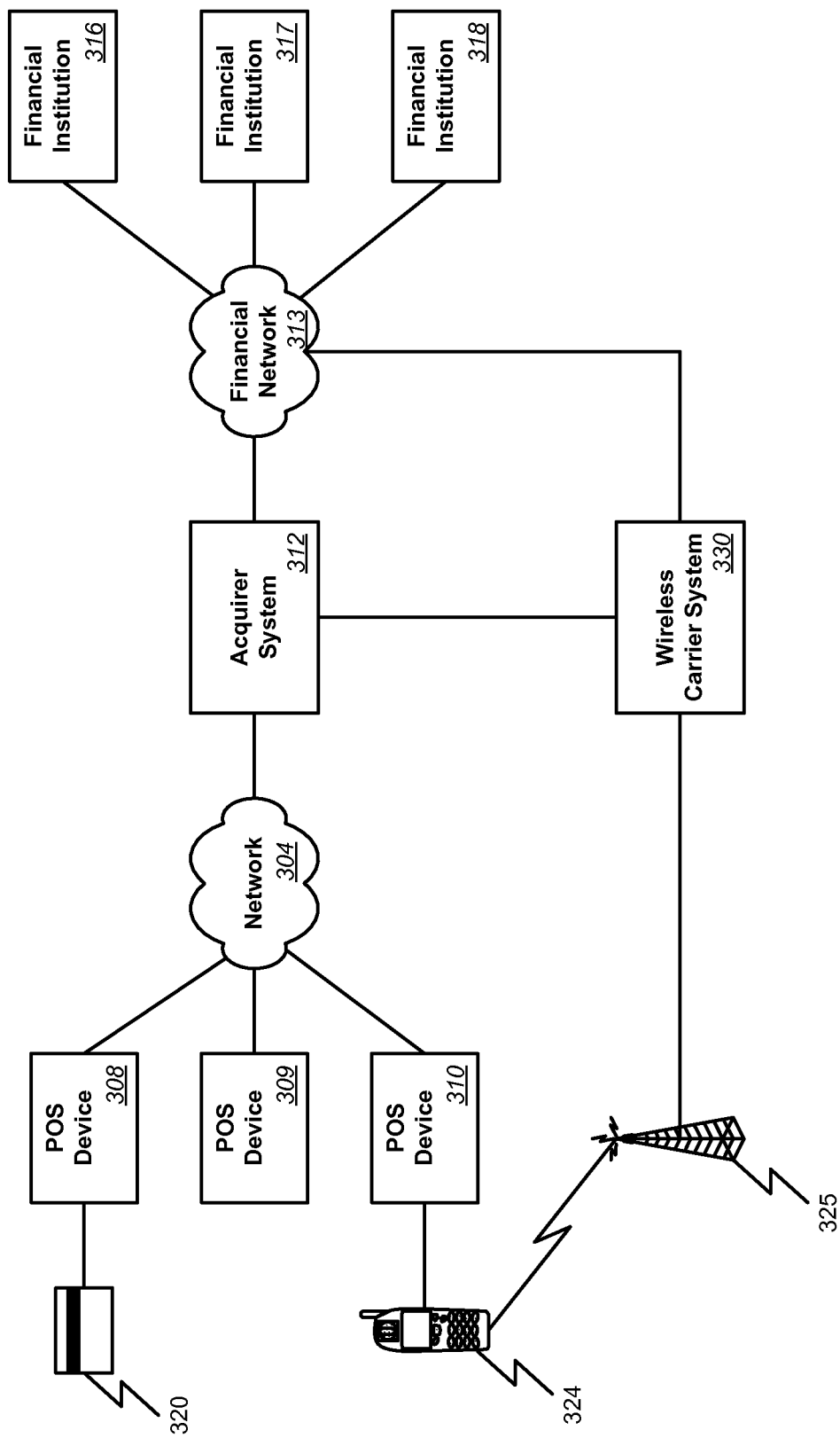
FIG. 3 is block diagram illustrating, at a high level, a system for processing transactions utilizing a mobile electronic device according to one embodiment of the present invention.

FIG. 3 is block diagram illustrating, at a high level, a system for processing transactions utilizing a mobile electronic device according to one embodiment of the present invention. Traditionally, a credit card may be issued to a customer by a financial institution such as a bank and typically displays a logo for an association that implements rules that govern aspects of use of the card. Account information is usually printed on the face of the card, specifying an account number, expiration date, and name of an authorized holder of the card; this information is also stored together with additional information on a magnetic stripe that is usually affixed to the back of the card. When the cardholder wishes to execute a transaction, such as a financial transaction for the purchase of goods and/or services, he presents the card 320 to a clerk at a merchant location, who swipes the card through a magnetic-stripe reader comprised by a point-of-sale device 308, or the consumer swipes the card themselves depending on POS set-up. Multiple point-of-sale devices 308-310 may have been provided at a variety of locations by an acquirer, who acts as an intermediary between merchants and the issuer financial institutions. As an intermediary, the acquirer coordinates transaction routing and performs a variety of backend processes such as merchant settlement and reporting.

The point-of-sale device 308 typically initiates a connection to an acquirer system 312 through a network 304 such as the Internet or another network as described above. A packet of information that includes information read from the magnetic stripe of the card 320, a merchant identifier, the date, and transaction amount are forwarded by the point-of-sale device 308 through the network 304 to the acquirer system 312. The acquirer system 312 may store some of the information and sends an authorization request, via financial network 313, to the issuing financial institution 316, which may be identified from a portion of the account number read from the magnetic stripe. The transaction is authorized or denied depending on such factors as the validity of the cardholder name, the validity of the card number, the level of available credit in comparison with the transaction amount, fraud validation checks, and the like. If authorized, an authorization code is routed back through the acquirer system 312, which captures additional information and forwards the authorization code back to the originating point-of-sale device 308 so that the transaction may be completed. Periodically, such as at the end of every day, the transactions are settled by the acquirer initiating funds transfers that fund merchant bank accounts with total transaction amounts that may have resulted from multiple transactions by multiple customers. Alternatively, single message protocols may be used which authorize and post the transaction in a single process, therefore eliminating the need for the end-of-day settlement process described above.

Other types of accounts may operate with similar structures, although the details for each type of account are different. For example, use of a debit account typically requires that the customer provide a personal identification number ("PIN"), which must be validated before any authorization for the transaction can be provided. Authorization usually depends on the current level of funds actually in the identified account rather than on a credit level, and funds transfer is usually executed substantially contemporaneously with providing the authorization rather than performing periodic settlement. In other examples, such as stored value (gift card) accounts, similar processes might be performed not using identifiable consumer data, such as consumer name (e.g. anonymous accounts). Other types of accounts may use arrangements that have similar differences in their particulars.

According to one embodiment, a mobile device 324 may be used in addition to or instead of a card or other presentation token representing an account. Here, the mobile device 324 is shown for exemplary purposes in the form of a cellular telephone. However, as noted above, the mobile device 324 may be any of a variety of different mobile devices including but not limited to a PDA, MP3 player, chip embedded stickers, etc. The mobile device 324 may communicate according to its normal wireless protocols with a wireless carrier system 330 via an existing network of relay stations 325 In addition, the mobile device 324 may communicate wirelessly with point-of-sale devices 314 that have been equipped for wireless communications, such as through an NFC messaging protocol.

According to one embodiment and as will be discussed in greater detail below, the mobile device 324 can be adapted to provide any of a number of mobile commerce functions related to one or more financial accounts such as credit accounts, debit accounts, demand deposit accounts, stored value accounts, etc. maintained by one or more financial institutions 316-318. The mobile device 324, for example via the mobile wallet application, may allow the user to review account balances, transfer balances, and/or select an account for a particular transaction such as a purchase or other payment. In the example of a purchase, upon selection of an account for use in the transaction, the user of the mobile device can tap, scan, or swipe the device 324 in front of or near the POS device 310 causing the selected account or other identifying information to be read from the mobile device 324 via the NFC connection.

In another example, a single uniquely identifiable data element (the account proxy), such as a mobile phone number, might be transmitted to the POS transaction process. Business rules can then be applied to cross reference the proxy number into an actual PAN prior to fully routing and/or processing the transaction. As an example, a consumer can initiate a transaction by selecting "pay now" on their mobile phone main menu screen. This can activate a new payment feature/application resident on the handset (a function of the mobile wallet). The handset application can pass data to the POS using a predefined format (e.g., an NFC based application). In lieu of a PAN, the consumers mobile phone number (or other unique number) can be passed through the POS to the acquiring network and on to a new server process which can select an account type based on purchase/transaction data and predefined 'rules' established by the consumer. The new process can select the appropriate payment type based on the rules, replace the proxy number with the appropriate PAN, and format the transaction message according to the host system associated with the selected PAN. At this point, the transaction can enter existing process flows for it's particular (existing) network/application.

Selection of the correct payment type to use for the type of transaction can use rules processing logic with decision criteria established by the consumer. For example, a consumer can select their "pay now" button from the main menu of their mobile handset when completing a transaction at a convenience store. The base transaction data such as transaction amount, merchant type, and proxy (mobile phone number), can be transmitted to the POS via an NFC based application exchange. The transaction data can be routed from the acquirer to a process where a rules check is made using previously established consumer rules (e.g. first use any eligible gift cards, then use my DDA/Debit account if the amount is less than $25, otherwise use my credit card account). Consumer rules for payment type selection can range from simple (e.g. always use my Debit card account for purchases under $25, otherwise use my Credit card), to very complex (e.g. first use stored value if applicable, then debit for purchases under $25 until a cumulative monthly spending cap of $500 is exceeded, then credit account #1 for purchases at category codes XXX, YYY, or ZZZ, otherwise use credit account #2, etc.). Once the appropriate payment account is determined, the system can 'insert' the true payment account PAN and other data needed to format the associated transaction and sends it on to the correct host system for subsequent processing functions.

Alternatively, the consumer can override the account selection logic by specifying exactly which account to use as the payment. This can be done by selecting the specific payment type using the mobile wallet user interface. For example, instead of selecting the "pay now" option, the consumer can specifically select credit account #2 from the list of available payment accounts listed in their mobile wallet menu.

The identifying information can indicate the account to be used in supporting transactions, for example, by including an indication of the financial institution 316 where that account is maintained, an account number, etc. According to one embodiment and as will be described in detail below, rather than storing account information on the mobile device to be read by the NFC reader, another unique identifier may be used. For example, a combination of the device serial number and user pin may be used to uniquely identify the user and/or device. The account to be used for the transaction can be indicated by information other than the account number and later correlated to the correct account number by the acquirer systems.

The point-of-sale device 308 typically initiates a connection to an acquirer system 312 through a network 304 such as the Internet or another network as described above. A packet of information that includes information read from the mobile device 324, a merchant identifier, the date, and transaction amount are forwarded by the point-of-sale device 310 through the network 304 to the acquirer system 312. The acquirer system 312 may store some of the information and send an authorization request, via financial network 313, to the issuing financial institution 318, which may be identified from a portion of the account number read from the mobile device 324. The transaction is authorized or denied depending on such factors as the validity of the account holder name, the validity of the account number, the level of available credit in comparison with the transaction amount, and the like. If authorized, an authorization code is routed back through the acquirer system 312, which captures additional information and forwards the authorization code back to the originating point-of-sale device 310 so that the transaction may be completed.

According to one embodiment, the mobile wallet of the mobile device may be provisioned via an Over-The-Air (OTA) process. Such a process can comprise provisioning the mobile wallet with information, applications, etc. provided by the financial institutions 316-318, the acquirer system 312, and/or a service provider or wireless carrier system 330 via the service provider network 325.

As will be seen, the mobile wallet and/or other applications of the mobile device may be used to initiate and/or perform other mobile commerce functions. For example, the mobile wallet (user interface) and other elements described herein can allow the user of the mobile device to use the device to make purchases, receive and maintain receipts or other records of transactions, look up account balances, transfer balances, etc. As noted above, embodiments described herein provide for the use mobile devices operating different mobile wallet applications on devices operating on different carrier networks. That is, embodiments of the present invention can be wallet application and/or carrier network agnostic. Additionally, embodiments of the present invention can be used to interact with a wide variety of content provider systems such as financial institutions, payment networks, advertisers, and other content providers. Thus, embodiments of the present invention can also be content provider agnostic.

Figure 4:
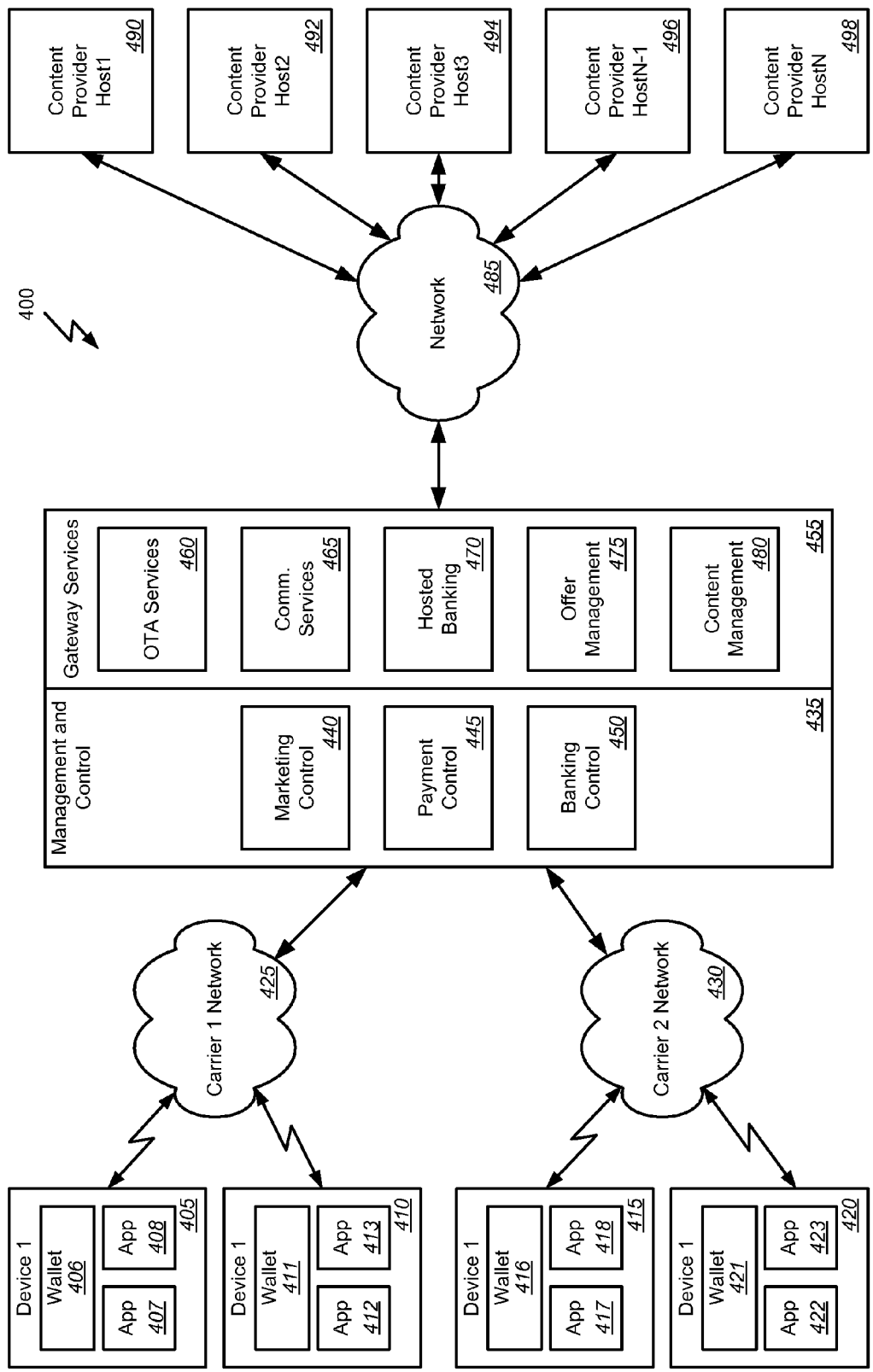
FIG. 4 is a block diagram illustrating additional details of the system of FIG. 3 according to one embodiment of the present invention.

FIG. 4 is a block diagram illustrating additional details of the system of FIG. 3 according to one embodiment of the present invention. According to one embodiment, a system 400 for supporting mobile commerce applications can comprise a plurality of wireless communications networks 425 and 430 and a plurality of mobile devices 405, 410, 415, and 420 communicatively coupled with each of the plurality of wireless communications networks 425 and 430. For example, the plurality of wireless communications networks 425 and 430 can comprise a plurality of cellular networks. According to one embodiment, the plurality of wireless communications networks 425 and 430 comprises at least a first network 425 operated by a first carrier and a second network 430 operated by a second carrier. In other cases, a greater or fewer number of networks may be used without departing from the scope of the present invention.

Each of the mobile devices 405, 410, 415, and 420 can be adapted to execute a mobile wallet application 406, 411, 416, and 421 providing access to a plurality of mobile commerce functions. the mobile wallet applications 406, 411, 416, and 421 may be supported by or provide access to any of a number of other applications 407, 408, 412, 413, 417, 418, 422, and 423. The mobile wallet applications 406, 411, 416, and 421, either alone or in combination with the other applications 407, 408, 412, 413, 417, 418, 422, and 423 can provide any of a number of mobile commerce applications as described herein and as can be understood by one skilled in the art. For example, mobile commerce functions that can be performed by the mobile wallets 406, 411, 416, and 421 and/or other applications 407, 408, 412, 413, 417, 418, 422, and 423 of the mobile devices 405, 410, 415, and 420 can include but are not limited to making payments, receiving and maintaining receipts or other records of transactions, looking up account balances, transferring balances, etc.

The system 400 can also include a management and control layer 435 communicatively coupled with the plurality of communications networks 425 and 430. According to one embodiment, the management and control layer 435 may be operated or controlled by an acquirer or issuer or service provider's agent as described above. It should be noted that the description of the management and control layer 435 as a separate layer is provided to illustrate a logical distinction only rather than to impose or imply any physical or other limitations. In some cases, the management and control layer 435 may be implemented as part of the same layer and/or systems as other elements of the system 400 or in another logical arrangement.

The management and control layer 435 can be adapted to control communications to and from the mobile wallet applications 406, 411, 416, and 421. For example, the management and control layer 435 can provide banking control 450 for controlling communications to and from the mobile wallet applications 406, 411, 416, and 421 related to banking functions of the mobile wallet applications 406, 411, 416, and 421, e.g., balance look ups, transfers, etc. Additionally or alternatively, the management and control layer 435 can provide payment control 445 to control communications to and from the mobile wallet applications 406, 411, 416, and 421 related to payment functions of the mobile wallet applications 406, 411, 416, and 421, e.g., when making a payment for goods or services. According to one embodiment, payment control 445 can contain the processes and decisioning logic used to select PAN's in the proxy processes described earlier. Additionally or alternatively, the management and control layer 435 can provide marketing control 440 to control communications to and from the mobile wallet applications 406, 411, 416, and 421 related to marketing functions of the mobile wallet applications 406, 411, 416, and 421, e.g., receiving and/or managing various discount offers and/or other marketing messages. Additional details of the management and control layer 435 and elements thereof will be described below with reference to FIG. 5.

The system can also have a gateway services layer 455 communicatively coupled with the management and control layer 435. For example, the elements of the gateway services layer 455 can be communicatively coupled with the management and control layer 435 via the Internet or other network (not shown here) as described above. According to one embodiment, the gateway services layer 455 may be operated or controlled by an acquirer or issuer or service provider's agent as described above. Alternatively, the Gateway Services layer can be adapted to support mobile banking services that are remotely hosted outside of the core systems included in this document. Again, it should be noted that the description of the gateway services layer 455 as a separate layer is provided to illustrate a logical distinction only rather than to impose or imply any physical or other limitations. In some cases, the gateway services layer 455 may be implemented as part of the same layer and/or systems as other elements of the system 400 or in another logical arrangement. Gateway services layer 455 can also contain or process transaction routing instructions used in the proxy process. For example, if the result of the decision process is to place the transaction on the consumers stored value account, the gateway services layer 455 can retrieve the stored value account number and other relevant details such as the stored value host routing network address and transaction formatting specifications.

The system can also include a plurality of content provider systems 490-498 communicatively coupled with the gateway services layer 455, for example via the Internet or other network 485. The content provider systems 490-498 can be adapted to provide financial transaction content or services related to the mobile commerce functions of the mobile wallet applications 406, 411, 416, and 421. For example, the plurality of content provider systems 490-498 can comprise one or more host systems of on or more financial institutions. In another example, the plurality of content provider systems 490-498 can additionally or alternatively comprise one or more payment networks. In yet another example, the plurality of content provider systems 490-498 can additionally or alternatively comprise one or more host systems providing marketing content.

According to one embodiment, the gateway services layer 455 can be adapted to provide communication services 465 to route communications between the management and control layer 435 and one or more of the plurality of content provider systems 490-498. That is, communications can be routed to one or more content provider systems 490-498 based on a determination of which of the content providers systems 490-498 handles content that is the subject of a communication. For example, a communication related to a transaction involving a particular account can be routed to a host system of a financial institution holding that account.

Additionally or alternatively, the gateway services layer can be further adapted to provide, or interface with, Over-The-Air (OTA) services 460 between the management and control layer 435 and one or more of the plurality of content provider systems 490-498. For example, depending upon the communications requirements of a particular content provider system, the type of communications being made, the transaction to which the communication relates, etc., other elements of the gateway services layer, such as the communication services 465, may invoke the OTA services 460 to support a particular communication or session.

In some cases, the gateway services layer 455 can be further adapted to provide/support hosted and un-hosted banking services 470 for one or more of the content provider systems 490-498. Generally speaking, hosted banking services 470, in conjunction with the mobile wallet of the mobile device and a service provided by the content provider system, i.e., a service of the financial institution holding a subject account, can provide services similar to current web-based online banking. For example, hosted mobile banking service 470 can provide for checking balances, making balance transfers, making online bill payments, etc. Un-hosted mobile banking and account services typically related to the processes required to communicate with host based account management and accounting systems (such as DDA or credit card accounts) to retrieve pertinent data elements, format them according to the service provider specifications, and granting access to the appropriate data. In this role, the gateway services layer 455 can act as a content supplier to other mobile applications that are provided by service providers.

Additionally or alternatively, the gateway services layer 455 can be adapted to provide offer management services 475 for managing information related to marketing functions of the mobile wallet applications 406, 411, 416, and 421. For example, the mobile wallet applications 406, 411, 416, and 421 may provide for receiving, displaying, and/or managing various types of coupons, offers, or other advertising messages. In such cases, the offer management services 475, for example via a web-based or other interface, can provide a means those entities providing such offers to manage the content of and/or criteria related to those offers.

In some cases, the gateway services layer 455 can be adapted to provide content management services 480 for managing information related to content discovery functions of the mobile wallet applications 406, 411, 416, and 421. For example, the mobile wallet applications 406, 411, 416, and 421 may provide for receiving, displaying, and/or managing various types of content discovery messages, e.g., "Find the nearest outlet for product X" upon the occurrence of some event of by request. In such cases, the content management services 480, for example via a web-based or other interface, can provide a means those entities providing such content discovery services to manage the content of and/or criteria related to those messages. Additional details of the gateway services layer 455 and elements thereof will be described below with reference to FIG. 5.

Figure 5:
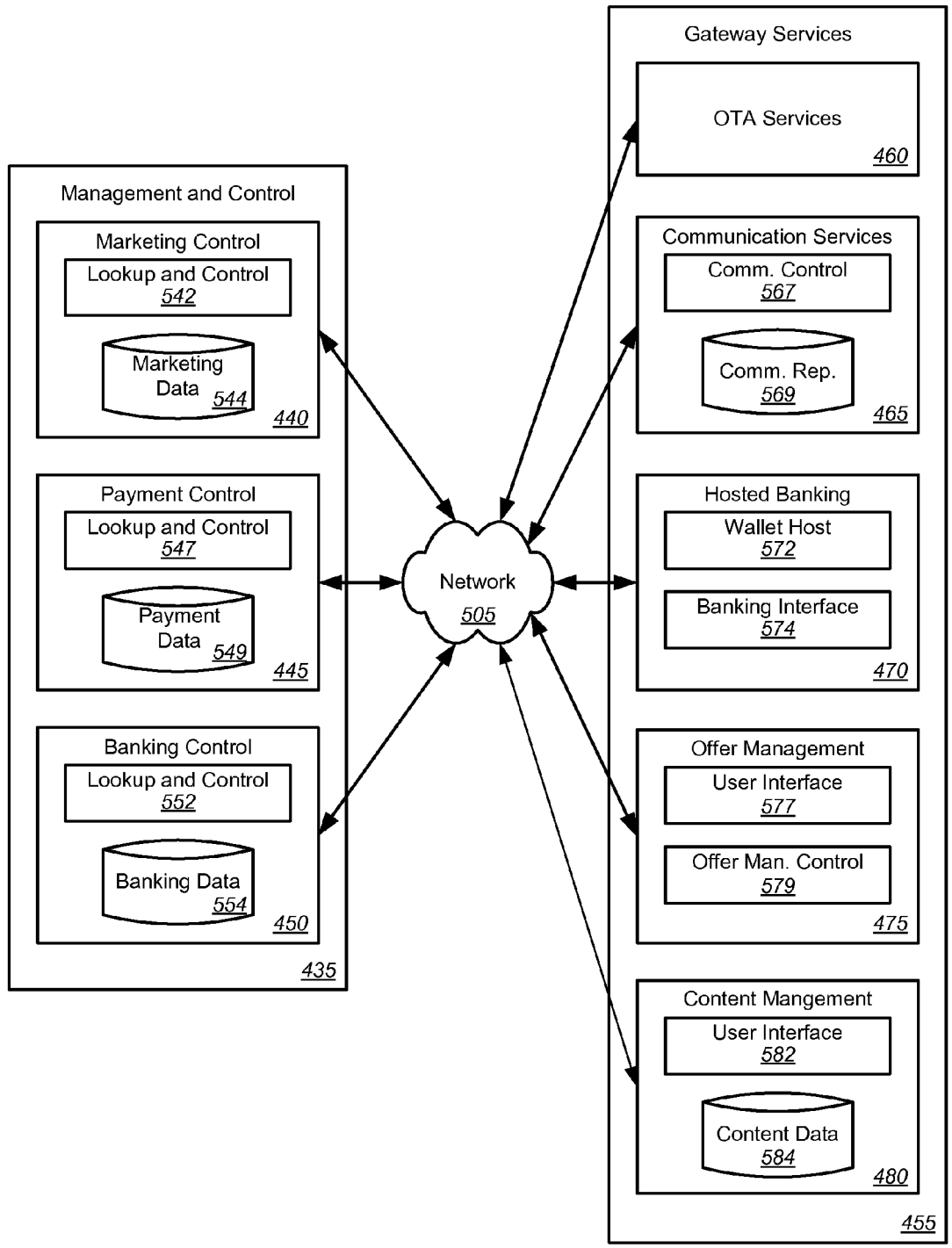
FIG. 5 is a block diagram illustrating additional details of the management and control layer and gateway services layer illustrated in FIG. 4 according to one embodiment of the present invention.

FIG. 5 is a block diagram illustrating additional details of the management and control layer and gateway services layer illustrated in FIG. 4 according to one embodiment of the present invention. As noted above, the system can also include a management and control layer 435 communicatively coupled with the plurality of wireless communications networks. The system can also have a gateway services layer 455 communicatively coupled with the management and control layer 435. For example, the elements of the gateway services layer 455 can be communicatively coupled with the management and control layer 435 via the Internet or other network 505 as described above. Again, it should be noted that the description of the management and control layer 435 and the gateway services layer 455 as separate layers is provided to illustrate a logical distinction only rather than to impose or imply any physical or other limitations. In some cases, the management and control layer 435 and gateway services layer 455 may be implemented as part of the same layer and/or systems in another logical arrangement, including but not limited to individual deployments of the individual logical components (e.g. the Gateway Services components can be implemented/deployed without some/all of the management and control components).

The management and control layer 435 can include a banking control module 450 for controlling communications to and from the mobile wallet applications related to banking functions of the mobile wallet applications, e.g., balance look ups, transfers, etc. For example, the banking control module 450 can include a lookup and control module 552 and a repository of banking information 554. The repository of banking information 554 can store, for example, information such as a unique identifier for each mobile device, e.g., a combination of device serial number and customer pin number or some other unique identifier, an account identifier, e.g., "checking account," "Visa," "gift card account," "savings account" etc., that names or identifies an account, an account number for that account, and a host ID identifying the content provider system related to that account, e.g., the financial institution host system for accessing the account.

In use, the banking control module 450 can receive a message from a mobile wallet application indicating its unique identifier and account identifier. Via the lookup and control module 552 the banking control module 450 can determine, based on the repository of banking data 554, the account number and host for processing the message. Additionally, the message may include other information such as a transaction type indicating a function to be performed, e.g., check balance, transfer, etc. The message can then be passed to the proper content provider system via the gateway services layer 455 as will be described below. It should also be understood that the lookup and control module 552 and/or banking control module 450 can perform additional functions such as securing the data stored in the repository of banking information 554, providing for the maintenance of the information therein, authenticating and/or authorizing users and/or requests, etc.

Additionally or alternatively, the management and control layer 435 can provide payment control 445 to control communications to and from the mobile wallet applications related to payment functions of the mobile wallet applications e.g., when making a payment for goods or services. For example, the payment control module 445 can include a lookup and control module 547 and a repository of payment credential information 549. The repository of payment credential information 549 can store, for example, information such as a unique identifier for each mobile device, e.g., a combination of device serial number and customer pin number or some other unique identifier, an account identifier, e.g., "checking account," "Visa," "savings account" etc., that names or identifies an account, an account number for that account, and a host ID identifying the content provider system related to that account, e.g., the financial institution host system for accessing the account.

In use, the payment control module 445 can receive a message from a mobile wallet application indicating its unique identifier and account identifier. Via the lookup and control module 547 the payment control module 445 can determine, based on the repository of payment credential information 549, the account number and host for processing the message. The message can then be passed to the proper content provider system via the gateway services layer 455 as will be described below. It should also be understood that the lookup and control module 547 and/or payment control module 445 can perform additional functions such as securing the data stored in the repository of payment credential information 549, providing for the maintenance of the information therein, authenticating and/or authorizing users and/or requests, etc.

Additionally or alternatively, the management and control layer 435 can provide marketing control 440 to control communications to and from the mobile wallet applications related to marketing functions of the mobile wallet applications, e.g., receiving and/or managing various discount offers and/or other marketing messages. For example, the marketing control module 440 can include a lookup and control module 542 and a repository of marketing information 544. The repository of marketing information 544 can store, for example, information such as a message, advertisement, offer, etc. to be provided, criteria for providing or targeting that message, etc. For example, the marketing data 544 can include one or more flags for a device or using indicating an opt-in or opt-out for receiving marketing messages. In other cases, the marketing data repository 544 can include more elaborate criteria for targeting marketing messages such as different transaction, demographic, and other criteria and/or one or more rule bases for applying the criteria.

Furthermore, the marketing control module 440 can be in communication with and/or monitor the processes of the other modules of the management and control layer 435. Thus, upon the occurrence of some event, e.g., payment for a purchase, the lookup and control module 547 can determine, based on the repository of marketing information 544, whether to generate and send a marketing message to that device.

According to one embodiment, the gateway services layer 455 can be adapted to provide communication services 465 to route communications between the management and control layer 435 and one or more of the plurality of content provider systems. That is, communications can be routed to one or more content provider and service provider systems based on a determination of which of the content providers systems 490-498 handles content that is the subject of a communication. For example, a communication related to a transaction involving a particular account can be routed to a host system of a financial institution holding that account. As noted above, such a determination may be made by the payment control module 445 or the banking control module 450 as described.

In response to a request from the payment control module 445 or the banking control module 450 to route a message to one or more of the content provider systems, the communications control module 567 can look up information related to that system in a communication repository 569. For example, such information may indicate a format, host routing address, protocol, or other information related to the target content provider system. Based on this information, the communication control module 567 can format a message appropriate to that system prior to transmission, and send the message to the correct host system or applicable network. Additionally, messages received from the content provider systems can be identified and read by the communications control module 567 based on format, protocol, and other information in the communications repository 569.

In some cases, proper formatting and control of messages to and from the content provider systems may be performed in combination with other elements of the gateway services layer 455. For example, the gateway services layer 455 can be further adapted to provide, or interface with, Over-The-Air (OTA) services 460 between the management and control layer 435 and one or more of the plurality of content provider systems 490-498. For example, depending upon the communications requirements of a particular content provider system, the type of communications being made, the transaction to which the communication relates, etc., other elements of the gateway services layer, such as the communication services 465, may invoke the OTA services 460 to support a particular communication or session.

In some cases, the gateway services layer 455 can be further adapted to provide hosted or un-hosted banking services 470 for one or more of the content provider systems. Generally speaking, hosted banking services 470, in conjunction with the mobile wallet of the mobile device and a service provided by the content provider system, i.e., a service of the financial institution holding a subject account, can provide services similar to current web-based online banking. For example, hosted banking service 470 can provide for checking balances, making balance transfers, making online bill payments, etc.

According to one embodiment, the hosted baking service 470 can include a wallet host 572 corresponding to the wallet application of the mobile device. Generally speaking, the wallet host 572 provides an interface for the hosted banking service 470 to the wallet application on the mobile device and vice versa. Thus, while illustrated here as a single host 572, it should be understood that, since more than one type of wallet application may be used, multiple wallet hosts 572 may be implemented by a hosted banking service 470.

Additionally, the hosted banking service can include a banking interface 574 in communication with the wallet host 572 and adapted to interface with the content provider (i.e., financial institution) system. According to one embodiment, the baking interface 574 can comprise an interface for interacting with the web service provided by the target financial institution to support online banking. Therefore, in use, the wallet host 572 can communicate with the wallet of the mobile device to receive request for banking functions and request the appropriate information or functions from the financial institution's online banking service via the banking interface 574, or through other communication paths such as direct connection to the account file of record system. In response, banking interface can receive the requested information or an acknowledgement of the requested function to be returned to the mobile wallet via the wallet host 572.

Additionally or alternatively, the gateway services layer 455 can be adapted to provide offer management services 475 for managing information related to marketing functions of the mobile wallet applications. For example, the offer management services 475, for example via a web-based or other interface 577, can provide a means for marketers or other entities providing marketing offers, advertisements, etc to manage the content of and/or criteria related to those offers stored in the marketing information repository 544 described above. Such functions may be provided, for example, via a web service or other offer management control module 579 in conjunction with the user interface 577.

In some cases, the gateway services layer 455 can be adapted to provide content management services 480 for managing information related to content discovery functions of the mobile wallet application. For example, the mobile wallet applications may provide for receiving, displaying, and/or managing various types of content discovery messages, e.g., "Find the nearest outlet for product X" upon the occurrence of some event of by request. In such cases, the content management services 480, for example via a web-based or other interface 582, can provide a means those entities providing such content discovery services to manage the content of and/or criteria related to those messages. Such content may be stored, for example, in a content repository 584 of the content management service 480.

Figure 6:
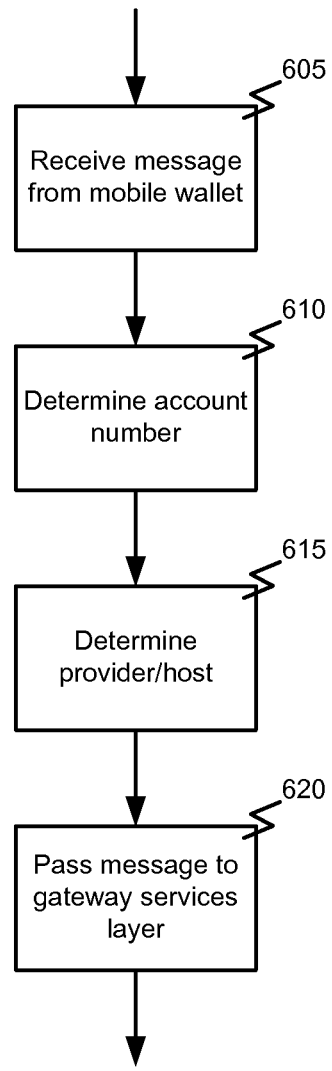
FIG. 6 is a flowchart illustrating a process which can be performed by a management and control layer according to one embodiment of the present invention.

FIG. 6 is a flowchart illustrating a process which can be performed by a management and control layer according to one embodiment of the present invention. In this example, the process can begin with receiving 605 a message from a mobile wallet application indicating its unique identifier and account identifier. Via a lookup a repository of banking data, payment data, or marketing data as described above or other repository, the account number and host for processing the message can be determined 610 and 615. The message can then be passed 620 to the gateway services layer as will be described above.

Stated another way, a process for supporting mobile commerce applications that can be performed by a management and control layer such as described above can comprise receiving 605 at the management and control layer of an acquirer system a message from a mobile wallet application. An account number associated with the mobile wallet application can be determined 610 based on one or more unique identifiers in the received message. A content provider system associated with the determined account number can be selected 615 from a plurality of content provider systems. The received message, account number and an indication of the selected content provider system can then be forwarded 620 to a gateway services layer of the acquirer system.

Figure 7:
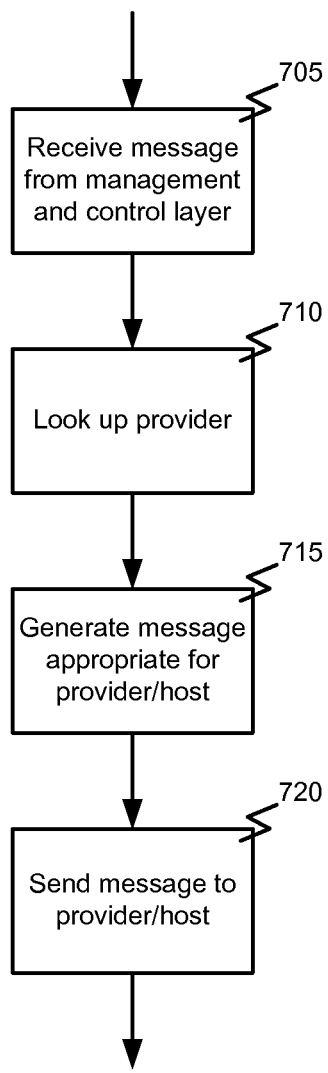
FIG. 7 is a flowchart illustrating a process which can be performed by a gateway services layer according to one embodiment of the present invention.

FIG. 7 is a flowchart illustrating a process which can be performed by a gateway services layer according to one embodiment of the present invention. In this example, processing can begin with the gateway services layer receiving 705 a message from the management and control layer to be routed to an identified content provider system or host. The gateway services layer can look up 710 information related to that system, for example in a communication repository as described above. For example, such information may indicate a format, protocol, or other information related to the target content provider system. Based on this information, the gateway services layer can generate 715 a message appropriate to that system prior to transmission. The generated message can then be sent 720 to the identified content provider system or host.

Stated another way, a process for supporting mobile commerce applications that can be performed by a gateway services layer such as described above can comprise receiving 705 at the gateway services layer of the acquirer system the message, account number and an indication of the selected content provider system from the management and control layer. Information related to the selected content provider system can be read 710 and a message specific to a host of the selected content provider system can be generated 715 based on the received message and the information related to the selected content provider system. The generated message can then be sent 720 to the host of the selected content provider system.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A system for supporting mobile commerce applications, the system comprising:
a management and control layer communicatively coupled with a plurality of wireless communications networks and adapted to control communications to and from a plurality of mobile wallet applications executed by a plurality of mobile devices in communication with the plurality of wireless communications networks, wherein the management and control layer is configured to control communications to and from the mobile wallet applications related to payment functions of the mobile wallet applications, and wherein being configured to control communications to and from the mobile wallet applications comprises the management and control layer being configured to:
receive transaction data from the first mobile device, wherein the transaction data comprises an account proxy, a merchant identifier, a transaction amount, and a transaction category code;
determine, based at least on the merchant identifier, whether a gift card account number associated with the account proxy is an accepted form of payment for a merchant associated with the merchant identifier; and
determining if the transaction amount exceeds a previously established amount;
replace the account proxy in the transaction data with a primary account number selected from a plurality of account numbers based on the merchant associated with the merchant identifier and a pre-defined rule established by a consumer associated with the first mobile device, wherein the pre-defined rule:
selects as the determined account number a gift card account number associated the gift card based at least on a determination that the merchant accepts the gift card;
selects as the determined account number a debit card account number based at least on:
a determination that the merchant does not accept the gift card; and
a determination that transaction amount does not exceed the previously established amount; and a determination that a cumulative monthly spending cap has not been exceeded;
selects as the determined account number a first credit account number based at least on:
a determination that the merchant does not accept the gift card;
a determination that the transaction amount does exceed the previously established amount and/or the cumulative monthly spending cap has been exceeded; and
a determination that the transaction category code is one of a previously determined plurality of category codes;
selects as the determined account number a second credit card account number based on:
a determination that the merchant does not accept the gift card;
a determination that the transaction amount does exceed the previously established amount and/or that the cumulative monthly spending cap has been exceeded; and
a determination that the transaction category code is not one of a previously determined plurality of category codes;
select from a plurality of content provider systems a content provider system associated with the selected account number; and
forward the transaction data, which includes the determined account number and the total amount of the transaction, along with an indication of the selected content provider system to a gateway services layer of the acquirer system.

2. The system of claim 1, wherein the plurality of wireless communications networks comprises a plurality of cellular networks.

3. The system of claim 1, wherein the plurality of wireless communications networks comprises at least a first network operated by a first carrier and a second network operated by a second carrier.

4. The system of claim 1, wherein the plurality of content provider systems comprises one or more host systems of one or more financial institutions.

5. The system of claim 1, wherein the plurality of content provider systems comprises one or more payment networks.

6. The system of claim 1, wherein the plurality of content provider systems comprises one or more host systems providing marketing content.

7. The system of claim 1, wherein the management and control layer is adapted to control communications to and from the mobile wallet applications related to banking functions of the mobile wallet applications.

8. The system of claim 1, wherein the management and control layer is adapted to control communications to and from the mobile wallet applications related to marketing functions of the mobile wallet applications.

9. The system of claim 1, wherein the gateway services layer is further adapted to provide Over-The-Air (OTA) services between the management and control layer and the plurality of content provider systems.

10. The system of claim 7, wherein the gateway services layer is further adapted to provide hosted banking services for one or more of the content provider systems.

11. The system of claim 8, wherein the gateway services layer is adapted to provide offer management services for managing information related to marketing functions of the mobile wallet applications.

12. The system of claim 1, wherein the gateway services layer is adapted to provide content management services for managing information related to content discovery functions of the mobile wallet applications.

13. A method of supporting mobile commerce applications, the system comprising:
receiving at a management and control layer of an acquirer system a message from a mobile wallet application, the message including an account proxy, a total amount of a transaction, a merchant identifier associated with a merchant, and a transaction category code;
determining an account number with the mobile wallet application based on the merchant associated with the merchant identifier and a consumer-defined rule by:
determining if the merchant accepts a gift card associated with the mobile wallet application;
determining if the total amount of the transaction exceeds a previously established amount;
selecting as the determined account number a gift card account number associated with the gift card based at least on a determination that the merchant accepts the gift card;
selecting as the determined account number a debit card account number based at least on:
a determination that the merchant does not accept the gift card; and
a determination that the transaction amount does not exceed the previously established account; and
a determination that a cumulative monthly spending cap has not been exceeded;
selecting as the determined account number a first credit account number based at least on:
a determination that the merchant does not accept the gift card;
a determination that the transaction amount does exceed the previously established amount and/or that the cumulative monthly spending cap has been exceeded; and
a determination that the transaction category code is one of a previously determined plurality of category codes; and
selecting as the determined account number a second credit account number based at least on:
a determination that the merchant does not accept the gift card;
a determination that the transaction amount does exceed the previously established amount and/or that the cumulative monthly spending cap has been exceeded; and
a determination that the transaction category code is not one of a previously determined plurality of category codes;
replacing the account proxy in the message with the determined account number;
selecting from a plurality of content provider systems at least one content provider system associated with the determined account number; and
forwarding the message, which includes the determined account number and the total amount of the transaction, along with and an indication of the selected content provider system to a gateway services layer of the acquirer system for later at least attempted withdrawal of funds by the selected content provider system.

14. The method of claim 13, further comprising:
receiving at the gateway services layer of the acquirer system the messages and the indication of the selected content provider system from the management and control layer;
reading information related to the selected content provider system;
generating a message specific to a host of the selected content provider system based on the received message and the information related to the selected content provider system; and
sending the generated message to the host of the selected content provider system.

15. The method of claim 14, wherein the plurality of content provider systems comprises one or more host systems of one or more financial institutions.

16. The method of claim 14, wherein the plurality of content provider systems comprises one or more payment networks.

17. The method of claim 14, wherein the plurality of content provider systems comprises one or more host systems providing marketing content.

18. The method of claim 14, wherein the message from the mobile wallet application comprises a message related to banking functions of the mobile wallet applications.

19. The method of claim 14, wherein the message from the mobile wallet application comprises a message related to payment functions of the mobile wallet applications.

20. The method of claim 14, wherein the message from the mobile wallet application comprises a message related to marketing functions of the mobile wallet applications.

21. A non-transitory machine-readable medium having stored thereon a series of instruction which, when executed by a processor, cause the processor to support mobile commerce applications by:
receiving at a management and control layer of an acquirer system a message from a mobile wallet application;

determining a merchant identified in the message;
determining a transaction amount identified in the message;
determining a transaction category code based on the message; determining if the merchant accepts a gift card associated with the mobile wallet application;
determining if the transaction amount exceeds a previously established amount;
determining an account number associated with the mobile wallet application based on the merchant identified in the received message, wherein determining the account number comprises:
selecting as the determined account number a gift card account number associated with the gift card based at least on a determination that the merchant accepts the gift card;
selecting as the determined account number a debit card account number based at least on:
a determination that the merchant does not accept the gift card; and
a determination that the transaction amount does not exceed the previously established amount; and
a determination that a cumulative monthly spending cap has not been exceeded; selecting as the determined account number a first credit account number based at least on:
a determination that the merchant does not accept the gift card;
a determination that the transaction amount does exceed the previously established amount and/or that the cumulative monthly spending cap has been exceeded; and
a determination that the transaction category, code is one of a previously determined plurality of category codes; and
selecting as the determined account number a second credit account number based at least on:
a determination that the merchant does not accept the gift card;
a determination that the transaction amount does exceed the previously established amount and/or that the cumulative monthly spending cap has been exceeded; and
a determination that the transaction category, code is not one of a previously determined plurality of category, codes;
selecting from a plurality of content provider systems a content provider system associated with the determined account number; and
forwarding the message, which includes the determined account number and the total amount of the transaction, along with and an indication of the selected content provider system to a gateway services layer of the acquirer system.

22. The non-transitory machine-readable medium of claim 21, further comprising:
receiving at the gateway services layer of the acquirer system the message and the indication of the selected content provider system from the management and control layer;
reading information related to the selected content provider system;
generating a message specific to a host of the selected content provider system based on the received message and the information related to the selected content provider system; and
sending the generated message to the host of the selected content provider system.

23. The non-transitory machine-readable medium of claim 22, wherein the plurality of content provider systems comprises one or more host systems of one or more financial institutions.

24. The non-transitory machine-readable medium of claim 22, wherein the plurality of content provider systems comprises one or more payment networks.

25. The non-transitory machine-readable medium of claim 22, wherein the plurality of content provider systems comprises one or more host systems providing marketing content.

26. The non-transitory machine-readable medium of claim 22, wherein the message from the mobile wallet application comprises a message related to banking functions of the mobile wallet applications.

27. The non-transitory machine-readable medium of claim 22, wherein the message from the mobile wallet application comprises a message related to payment functions of the mobile wallet applications.

28. The non-transitory machine-readable medium of claim 22, wherein the message from the mobile wallet application comprises a message related to marketing functions of the mobile wallet applications.

* * * * *